(12) United States Patent
Ferren et al.

(10) Patent No.: US 6,930,702 B1
(45) Date of Patent: Aug. 16, 2005

(54) DEVICE FOR POSITIONING AND OPERATING AUDIO AND VIDEO EQUIPMENT

(75) Inventors: Bran Ferren, Beverly Hills, CA (US); W. Daniel Hillis, Toluca Lake, CA (US)

(73) Assignee: Applied Minds, Inc., Glendale, CA (US)

( * ) Notice: Subject to any disclaimer, the term of this patent is extended or adjusted under 35 U.S.C. 154(b) by 112 days.

(21) Appl. No.: 10/121,555

(22) Filed: Apr. 11, 2002

Related U.S. Application Data

(60) Provisional application No. 60/283,158, filed on Apr. 11, 2001.

(51) Int. Cl.[7] ............................................. H04N 7/14
(52) U.S. Cl. ................................ 348/14.11; 348/14.08
(58) Field of Search ........................ 348/14.01–14.05, 348/14.07–14.09, 14.1, 14.11, 143, 151–153, 348/211.12, 211.99; 381/83, 85; 386/107; 715/753; 370/260–263

(56) References Cited

U.S. PATENT DOCUMENTS

| 3,992,586 | A | * | 11/1976 | Jaffe | ............................. | 381/83 |
| 4,881,135 | A | * | 11/1989 | Heilweil | ....................... | 386/107 |
| 5,426,510 | A | * | 6/1995 | Meredith | ..................... | 386/107 |
| 5,598,209 | A | * | 1/1997 | Cortjens et al. | ....... | 348/211.12 |
| 5,751,337 | A | * | 5/1998 | Allen et al. | ............... | 348/14.07 |
| 5,963,245 | A | * | 10/1999 | McDonald | ............... | 348/14.01 |
| 6,292,211 | B1 | * | 9/2001 | Pena | ........................ | 348/14.08 |

FOREIGN PATENT DOCUMENTS

| JP | 04322649 A | * | 11/1992 | .......... A61G 12/00 |
| JP | 08084328 A | * | 3/1996 | ............ H04N 7/14 |

* cited by examiner

Primary Examiner—George Eng
(74) Attorney, Agent, or Firm—Glenn Patent Group; Michael A. Glenn

(57) ABSTRACT

A mount for devices used in a teleconferencing site is disclosed. The mount positions and secures the devices in a substantially linear array along a wall of the teleconference site.

The mount provides both power and communication connections to the each of the devices.

The preferred embodiment of the invention allows the devices to be secured and connected in a single mechanical motion. This is accomplished with an extrusion, which is preferably recessed within a channel shaped cavity within the wall of the teleconference site. The recessed cavity may be enclosed by a cover.

A serial bus and distributed switching scheme allowing selective communication with each of the mounted devices are also disclosed.

16 Claims, 3 Drawing Sheets

DEVICE FOR POSITIONING AND OPERATING AUDIO AND VIDEO EQUIPMENT

RELATED APPLICATIONS

This application claims priority to U.S. Provisional Patent application Ser. No. 60/283,158 filed Apr. 11, 2001.

BACKGROUND OF THE INVENTION

1. Technical Field

This invention relates to the positioning and operation of audio and video devices. More particularly, the invention relates to methods and systems used for positioning, securing, orienting, and addressing the audio and video equipment used during a teleconference.

2. Description of the Prior Art

During a teleconference conducted between a local site and a remote site, it is often desirable to select for transmission to the remote site a video signal obtained from one among several video cameras positioned throughout the local teleconferencing site. Similarly, it is often desirable to obtain an audio signal from one among several microphones. This is especially true when there is more than one local video conferencing participant. In this case, the selection of the video and audio signals may be performed in a manner that simulates the shift in attention of an observer physically present at the local site. For example, the selected video signal may be obtained from a video camera offering a prominent view of the current speaker, and the selected audio signal may be obtained from a microphone offering the clearest rendering of the current dialogue. Providing video and audio signals to the remote participant in this manner offers more natural and comprehensive interaction with the local teleconferencing site. If performed correctly, the local video conferencing site and the local participants are seamlessly reconstructed at the remote teleconferencing site for viewing by the remote participant.

This goal motivates the use of a number of audio and video devices positioned at various locations throughout the local teleconferencing site. If traditional mounts such as tripods, are used to position and secure the devices, the resulting abundance of equipment is both aesthetically unpleasing and a significant impediment to the movement of participants within the teleconferencing site. More sophisticated grip equipment may allow the participants to move more freely around the site, but such equipment remains aesthetically undesirable—both for the local participants, and for the remote participants when the equipment lies within the field of view of one or more of the video cameras. Such equipment is frequently difficult to assemble and operate, and is often prohibitively expensive.

Furthermore, in many conferencing sites, each device is connected to a central audio and video controller with dedicated cabling. The extensive cabling accompanying such a setup is difficult to conceal and organize. This is particularly unfortunate if one considers that at any one time, the signal transmitted by a particular device is most likely not the selected signal, and is therefore not actually transmitted to the remote site. In this regard, a large portion of the troublesome cabling is unnecessary.

What is needed is a system that positions and secures audio and video equipment in a configuration that allows for effective capture of events occurring throughout the entirety of a teleconferencing site, yet that is neither aesthetically obtrusive nor physically cumbersome. Finally, the system should operate with a minimum amount of cabling, which is configured in a simple manner.

SUMMARY OF THE INVENTION

The presently preferred embodiment of the invention comprises a mount for devices used in a teleconferencing site. The mount positions and secures the devices in a substantially linear array along a wall of the teleconference site. The mount provides both power and communication connections to each of the devices, allowing each device to provide a signal to a signal destination.

The preferred embodiment of the invention allows the devices to be secured and connected in a single mechanical motion. This is accomplished with an extrusion designed to receive the devices mechanically. An adapter specific to a particular device may alternatively be used to couple the device to the extrusion.

Also, in the preferred embodiment of the invention, the devices and mount are recessed within a channel shaped cavity within the wall of the teleconference site. The recessed cavity may be enclosed by a cover, effectively shielding the mount and devices from the view of the teleconference participants.

The presently preferred embodiment of the invention also incorporates a serial bus to allow for selective communication with each of the devices on the mount. Other embodiments of the invention incorporate a distributed switching configuration selectively coupling each of the devices to a common signal line.

DETAILED DESCRIPTION OF THE INVENTION

The presently preferred embodiment of the invention positions and secures audio and video devices on a rail-like mount located along one or more walls of a teleconferencing site.

The devices may include, for example, microphones, speakers, still cameras, video cameras, and projectors. The mount is preferably positioned at head level to allow microphones to capture sound at mouth level, speakers to emit sound at ear level, and cameras to view the participants at a natural viewing angle.

Figure 1:
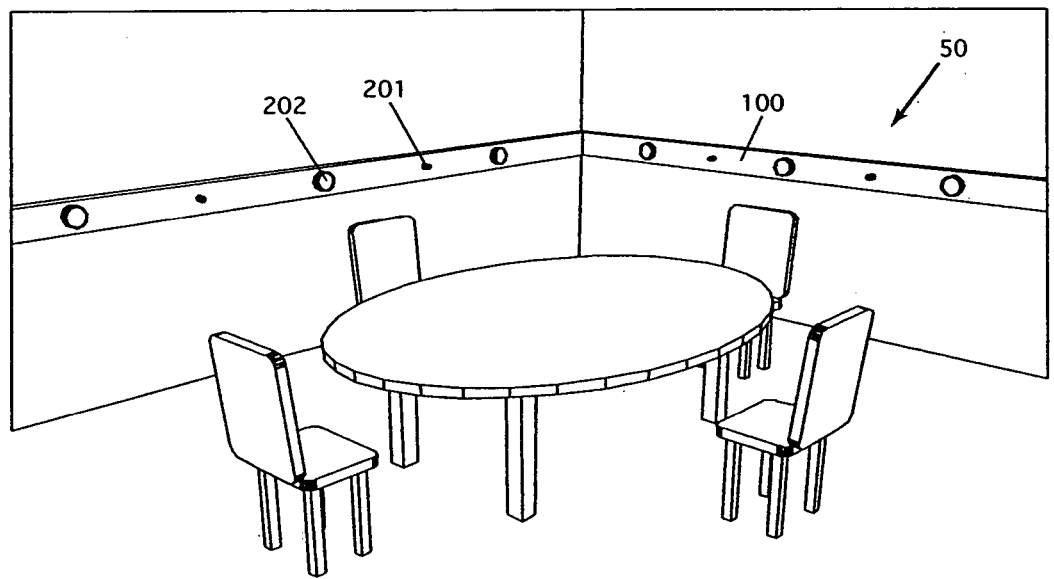
FIG. 1 shows a video conferencing site incorporating audio and video devices positioned and secured according to the invention.

FIG. 1 shows a video conferencing site incorporating audio and video devices positioned and secured according to the invention. Located along the walls 50 of the video conferencing site is the mount 100 for the audio and video devices. Positioned and secured along the mount are devices, such as microphones 201 and video cameras 202.

The devices are positioned in a configuration allowing for effective viewing and acoustic imaging of the entire teleconferencing site.

Preferably, especially if large devices are to be used, the devices may be recessed within a channel shaped cavity within the wall. The recessed cavity may be covered with a panel constructed of a material, such as glass or plastic. This cover may have one or more apertures as required by the specific devices enclosed within the channel. The panel may be tinted or may have neutral density or circular polarizing properties that obscure from view the equipment located behind the panel, yet that allow video devices adequate access to the conference site. The material is preferably positioned flush or nearly flush with the surface of the wall.

The recessed and covered cavity closely resembles the protective chair rail commonly found in business offices (and may, in some embodiments, be configures to act as such as well), and is therefore neither visually nor physically obtrusive. The system thus allows for the convenient placement yet effective operation of a great number of audio and video devices within a simple, discreet, and aesthetically pleasing configuration.

In the simplest embodiment of the invention, each device obtains electrical power from a single line that distributes power along the mount. A cable carrying the signal provided by each device is routed within or alongside the mount, or within the recessed cavity, from the device to a central controller such as an audio and video matrix switch. The central controller, allows for selection of the desired audio and video signals.

Thus, in the simplest embodiment, the cabling associated with the devices is conveniently hidden from sight within the recessed cavity. In the presently preferred embodiment of the invention, however, the cabling is not only obscured but also simplified.

Figure 2:
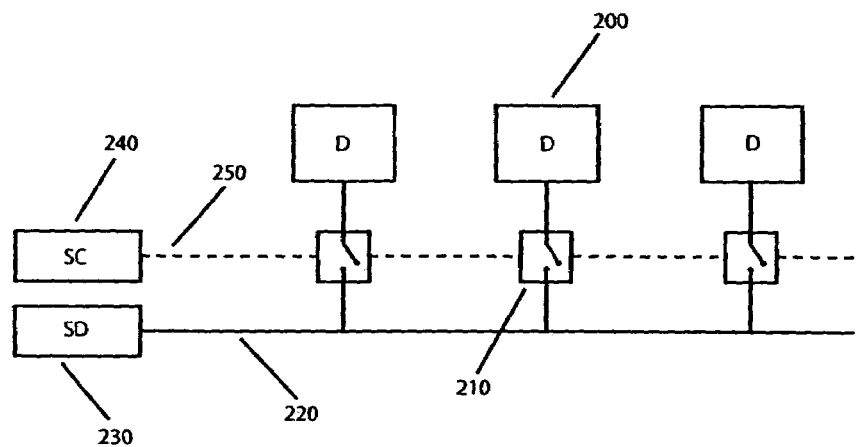
FIG. 2 shows a distributed switching configuration for addressing multiple audio and video devices according to the invention.

FIG. 2 shows a distributed switching configuration for addressing multiple audio and video devices according to the invention. Several devices 200 are connected, via a switch 210 to a common signal line 220 capable of transmitting the signal provided by each of the devices.

The common signal line is routed along the length of the mount, and provides the signal from the devices to a signal destination 230. In the presently preferred embodiment, the signal destination is a software or hardware module that implements a compression algorithm which compresses the signal for transmission to the remote site. Preferably, all devices share a single common signal line. However, if the signals provided by all devices are not capable of being transmitted on one type of line, it may be necessary to have one more than one common signal line, with groups of similar devices sharing a single line.

The common signal line and signal destination may be incapable of simultaneously providing and receiving, respectively, all of the signals provided by the devices connected to the common line. Accordingly, a switch controller 240, connected to each of the switches 210 by a switch control line 250, operates the switches to select from among all devices a subset of devices to provide a signal to the signal destination 230 through the common line 220.

Preferably, the device or devices selected are those devices most effectively capturing the events occurring within the teleconference site. If it is desired to select more than one device simultaneously, it may be necessary to employ more than one common signal line.

Figure 3:
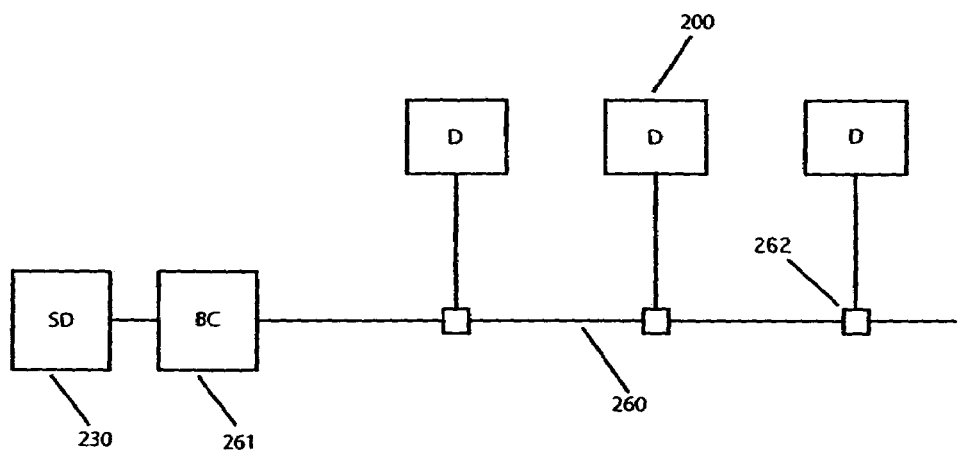
FIG. 3 shows a serial bus configuration for addressing multiple audio and video devices according to the invention.

FIG. 3 shows a serial bus configuration for addressing multiple audio and video devices according to the invention. In this preferred embodiment of the invention, a serial bus 260 is used to communicate with each of the mounted devices 200. A bus controller 261 is used to select and provide the desired device signal to a signal destination 230. Each device 200 is connected to the bus by a connection 262, preferably a three port serial bus hub. In some embodiments of the invention, the bus controller, signal destination, or both, may be embodied by or contained within a microprocessor based device. Thus, the desired signal may be selected simply by addressing the appropriate device on the serial bus. Several existing serial bus protocols, such as USB and IEEE 1394, are suitable choices for use in this embodiment. These and similar protocols offer the added advantage of providing power to the devices as well.

Alternatively, a new serial bus protocol may be developed to support device functionality not available through existing protocols. For example, such protocol preferably allows a device to identify its device type, its position along the mount, and its angular orientation relative to the mount. A device may then be selected based on its function, position, and alignment. It is also possible to employ a combination of serial bus protocols, offering compatibility with a greater number of audio and video devices.

If a serial bus or combination of serial buses is employed, the mount may be connected to a communications network, thereby allowing for control of the devices from a remote location. In such a system, each device on the mount is assigned a hardware address, with an application level protocol facilitating communication with the mount from the remote location. The application level protocol further allows the mount to identify to the remote location the devices connected to the mount, and allows for selection of individual devices as desired.

Both the distributed switching and serial bus embodiments greatly reduce and simplify the wiring associated with the devices. Further, the presently preferred embodiment of the invention allows a device to be both physically mounted on and electronically connected to the mount with a single, simple operation. This may be accomplished through the use of a specially shaped extrusion, either attached to the wall or the interior of the recessed cavity. The extrusion is shaped and connections are provided to match the requirements of the particular audio and video devices used. Alternatively, a series of adapters may be provided to allow varying devices to be secured to a common mount.

Figure 4:
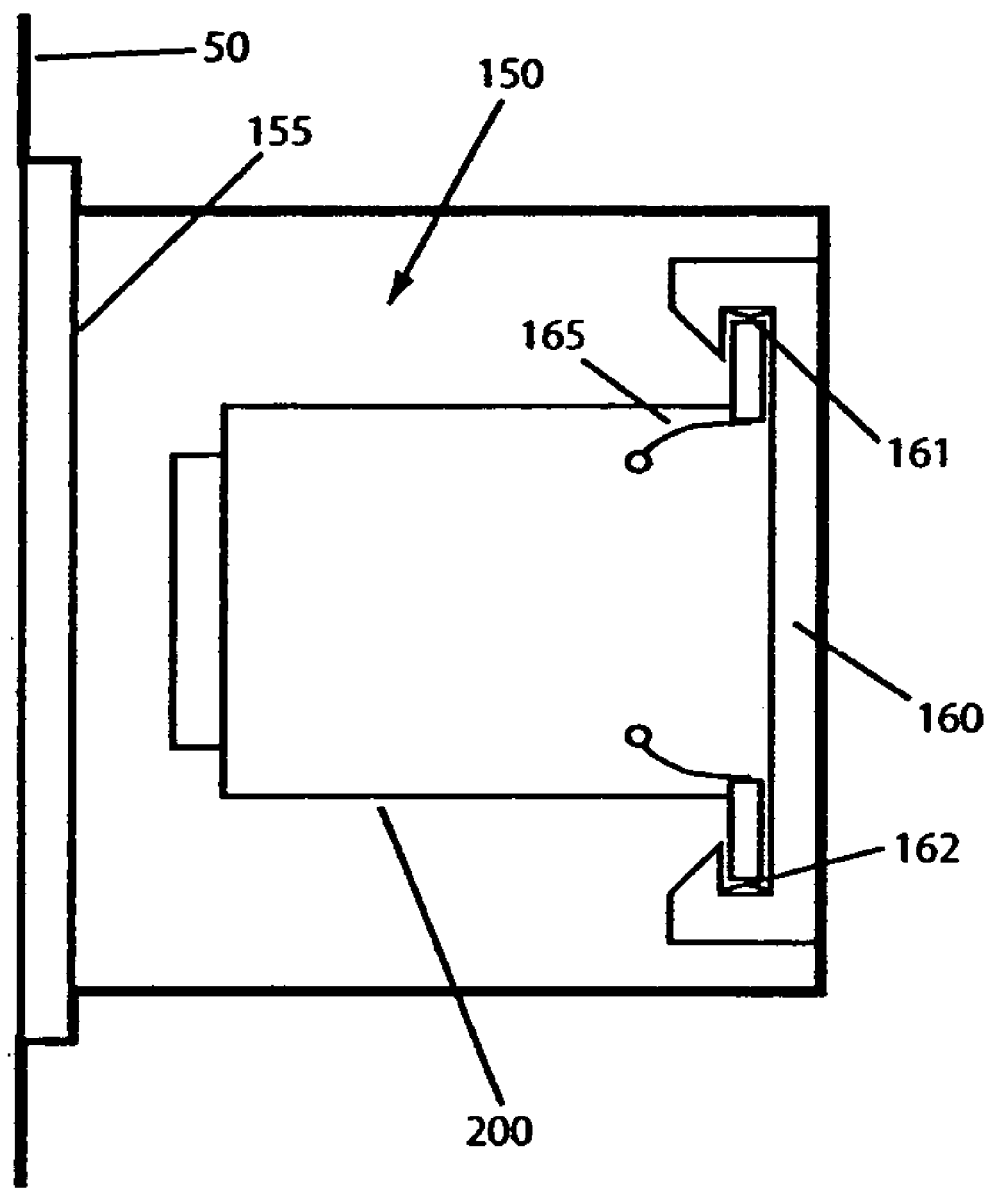
FIG. 4 shows a cross-sectional view of a recessed cavity enclosing a mount and a device mount according to the invention.

FIG. 4 shows a cross-sectional view of a recessed cavity enclosing a mount and a device mount according to the invention. A device 200 is enclosed within a channel shaped cavity 150 within a wall 50 of the conferencing site. The recessed cavity is covered with a panel 155.

The device 200 is mechanically positioned and secured by an extrusion 160. The extrusion may be modular in construction, allowing for simple and rapid installation or extension of the mount. Preferably, the extrusion comprises a power connection 161 that provides the power required by the device, and a communications connection 162 that allows communication with the device. As noted, the extrusion and cavity are preferably oriented horizontally along one or more walls of the conferencing site. However, other orientations and heights may be selected as demanded by a particular application.

The power and communications connections may be analog or digital in nature, and may themselves comprise more than one connection. Depending on the specific device and the chosen connection configuration, e.g. distributed switching, serial bus, etc., the communications connection may merely transmit the signal provided by the device or may also allow information regarding the identification and operation of the device to be transmitted to and from the device. Also, for certain connection configurations, in particular if certain serial buses are used, the power and communications connections may be one and the same.

The connections are preferably automatically established upon securing the device 200 to the extrusion 160. This may be accomplished through the use of spring 165 loaded connections.

The extrusion may offer a series of potential connection points at discrete intervals along the mount, or may allow the devices to be positioned in a continuous manner with a sliding motion along the mount. The positioning and securing mechanism may allow for the angular orientation of the device relative to the mount to be varied. For example, a video camera may be panned or tilted, while a directional microphone may be aligned along a desired axis. In some embodiments, the angular adjustment of the devices may be motorized. Command instructions for such motion may be provided through the communications connection 162.

The invention thus allows for a large number of devices to be positioned and secured quickly and precisely, thereby offering thorough and accurate coverage of the events occurring within the teleconferencing site.

In summary, the invention provides a mechanism that positions and secures audio and video devices within a teleconferencing site in a discrete yet effective manner. The devices are not obtrusive to the local or remote conferencing participants, yet the devices obtain a complete and natural view of the teleconferencing site. Furthermore, the equipment used to secure, provide power to, and communicate with the devices is both reduced and obscured from view. As such, the peripheral equipment, as with the devices themselves, is neither intrusive nor cumbersome.

It should be noted that the devices mounted along the mount need not be limited to the audio and video devices described in the aforementioned embodiments. The devices may also include clocks, cue lights, illumination devices, remote control sensors, radio frequency identification readers, motion detectors, volumetric sensors and scanners, infrared communications ports for personal digital assistants, or any other device beneficial in a teleconferencing setting.

Additionally, while the invention has been described as a substantially linear mount, e.g. similar to a conference room chair rail, it will be appreciated by those skilled in the art that the invention may be circular, e.g. for affixing to a conference room ceiling, e.g. as a crown molding, or it may be made in other shapes as well.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A mount for a plurality of devices used at a teleconference site, comprising:
   at least one linear extrusion;
   a plurality of positioning and securing means attachable to said linear extrusion, each of said positioning and securing means capable of positioning and securing one of said devices in communication with said linear extrusion;
   means integrated with said extrusion for securing said mount to either of a wall and ceiling of said teleconference site;
   means integrated with said extrusion for establishing a power connection to each of said devices; and
   at least one element integrated with said extrusion for establishing a signal communication path, wherein said at least one element serves a plurality of devices to provide a physical communication path between each of said devices and a destination.

2. The mount of claim 1, wherein said linear extrusion has a substantially horizontal orientation.

3. The mount of claim 2, wherein said linear extrusion is substantially aligned at a head level of a teleconference participant.

4. The mount of claim 1, wherein said devices comprise audio devices and video devices.

5. The mount of claim 4, wherein said devices comprise video cameras and microphones, said devices collectively providing coverage of audible and visible events transpiring at said teleconference site.

6. The mount of claim 1, wherein said positioning and securing means comprises at least one receptacle specific to at least one of said devices.

7. The mount of claim 1, wherein said mount and said devices are positioned within a recessed channel.

8. The mount of claim 7, wherein said recessed channel is substantially enclosed by a cover;
   wherein said cover is optionally substantially flush with either of said teleconference site wall and ceiling.

9. The mount of claim 8, wherein said mount, said recessed channel, and said cover substantially resemble a chair rail.

10. The mount of claim 1, wherein said destination comprises a matrix switch.

11. The mount of claim 1, wherein said at least one element for establishing a communication path comprises:
    a common signal line communicatively coupled with said destination;
    at least one switch for selectively coupling each of said devices to said common signal line; and
    a controller for controlling each of said switches.

12. The mount of claim 1, wherein said at least one element for establishing a communication path comprises:
    a serial bus in communication with each of said devices; and
    a bus controller in communication with said serial bus; for selectively addressing each of said devices.

13. The mount of claim 12, further comprising:
    a communication protocol;
    wherein said bus controller is in communication with a network;
    wherein each of said devices is assigned an address; and
    wherein said communication protocol effects selective communication with each of said devices by selectively addressing said devices.

14. A mount for a plurality of devices within a room, comprising:
    at least one extrusion for positioning a plurality of said devices in at least one substantially linear array, and for mechanically fixing each of said devices to an interior surface of said room;
    said extrusion further comprising:
       means integrated therewith for establishing a power connection to each of said devices, and
       at least one element integrated therewith, wherein said at least one element establishes a physical communication path between each of a said plurality of said devices, and a signal destination;

wherein said extrusion and said devices are positioned within a recessed channel formed through said interior surface of said room; and wherein said channel is substantially enclosed by a cover which is substantially flush with said interior surface of said room to conceal said devices.

15. The mount of claim 14, wherein said surface is a wall and said mount is formed as a chair rail.

16. The mount of claim 14, wherein said surface is a ceiling and said mount is formed as a crown molding.

* * * * *